US011618196B2

(12) United States Patent
Ward (10) Patent No.: US 11,618,196 B2
(45) Date of Patent: Apr. 4, 2023

(54) SEQUENTIAL INJECTION TO MULTIPLE MOLD CAVITIES

(71) Applicant: Synventive Molding Solutions, Inc., Peabody, MA (US)

(72) Inventor: Daniel Ward, West Newbury, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 212 days.

(21) Appl. No.: 17/197,317

(22) Filed: Mar. 10, 2021

(65) Prior Publication Data

US 2021/0268707 A1    Sep. 2, 2021

Related U.S. Application Data

(63) Continuation of application No. PCT/US2021/018973, filed on Feb. 22, 2021.
(Continued)

(51) Int. Cl.
*B29C 45/76* (2006.01)
*B29C 45/27* (2006.01)
(Continued)

(52) U.S. Cl.
CPC ...... *B29C 45/7613* (2013.01); *B29C 45/2708* (2013.01); *B29C 45/2725* (2013.01);
(Continued)

(58) Field of Classification Search
CPC ............... B29C 45/7613; B29C 45/77; B29C 2045/2691
See application file for complete search history.

(56) References Cited

U.S. PATENT DOCUMENTS

| 5,362,222 A | 11/1994 | Faig et al. |
| 6,294,122 B1 | 9/2001 | Moss et al. |

(Continued)

FOREIGN PATENT DOCUMENTS

| DE | 20 2008 010772 U1 | 11/2008 |
| JP | H07 290485 A | 11/1995 |

(Continued)

OTHER PUBLICATIONS

International Search Report and Written Opinion in related international application PCT/US2020/054354 dated Feb. 17, 2021.
(Continued)

*Primary Examiner* — James Sanders
(74) *Attorney, Agent, or Firm* — Polsinelli, P.C.

(57) ABSTRACT

An Injection molding apparatus injection molding apparatus (10a) comprising:
one or more first downstream channels (166, 166a, 166b) and associated first gates (34, 34a, 34b) that deliver injection fluid (18) to a first cavity (300a) of a mold system (302, 303) and to
one or more second downstream channels (168, 168a, 168b) and associated second gates (32, 32a, 32b) that deliver injection fluid to a second cavity (300b) of the mold system (302, 303),
the mold system being clamped together under a selected force,
the apparatus including a first upstream valve (118) that enables and disables flow of the injection fluid to the first gates (34, 34a, 34b) and a second upstream valve (108) that enables and disables flow of the injection fluid to the one or more second gates (32, 32a, 32b),
the apparatus including a control system (20) adapted to open or enable flow of the injection fluid (18) to the one or more first gates (34, 34a, 34b) at a first selected time
(Continued)

and to further instruct the second upstream valve (108) to open or enable flow of the injection fluid (18) to the one or more second gates (32, 32a, 32b) at a second selected time that is delayed relative to the first selected time during the course of an injection cycle.

29 Claims, 8 Drawing Sheets

Related U.S. Application Data

(60) Provisional application No. 62/978,928, filed on Feb. 20, 2020.

(51) Int. Cl.
  *B29C 45/28* (2006.01)
  *B29C 45/77* (2006.01)
  *B29C 45/26* (2006.01)

(52) U.S. Cl.
  CPC ............ *B29C 45/281* (2013.01); *B29C 45/77* (2013.01); *B29C 2045/2691* (2013.01)

(56) References Cited

U.S. PATENT DOCUMENTS

| | | |
|---|---|---|
| 6,309,208 B1 | 10/2001 | Kazmer et al. |
| 2003/0122272 A1 | 7/2003 | Smith et al. |
| 2007/0273060 A1 | 11/2007 | Doyle et al. |
| 2018/0264698 A1 | 9/2018 | Bazzo et al. |

FOREIGN PATENT DOCUMENTS

| | | |
|---|---|---|
| JP | 2005 053074 A | 3/2005 |
| WO | 2003/057448 A1 | 7/2003 |

OTHER PUBLICATIONS

International Search Report and Written Opinion in related international application PCT/US2020/018973 dated Apr. 28, 2021.

SEQUENTIAL INJECTION TO MULTIPLE MOLD CAVITIES

RELATED APPLICATIONS

This application claims the benefit of priority to PCT/US21/18973 filed Feb. 22, 2021 which claims priority to U.S. application Ser. No. 62/978,928 filed Feb. 20, 2020 the disclosures of which are incorporated by reference in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,419,870, 6,464,909, 6,062,840, 6,261,075, 6,599,116, 7,234,929, 7,419,625, 7,569,169, 8,297,836 U.S. patent application Ser. No. 10/214,118, filed Aug. 8, 2002, U.S. Pat. Nos. 7,029,268, 7,270,537, 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, U.S. application Ser. No. 10/101,278 filed Mar. 19, 2002 and PCT Application No. PCT/US11/062099 and PCT Application No. PCT/US11/062096, U.S. Pat. Nos. 8,562,336, 8,091,202 and 8,282,388, 9,724,861, 9,662,820, Publication No. WO2015006261, Publication No. WO2014209857, Publication No. WO2016153632, International publication no. WO2016153704, U.S. Pat. No. 9,205,587, U.S. application Ser. No. 15/432,175 filed Feb. 14, 2017, U.S. Pat. No. 9,144,929, U.S. Publication No. 20170341283, International Application WO2017214387, International Application PCT/US17/043029 filed Jul. 20, 2017, International Application PCT/U.S. Ser. No. 17/043,100, filed Jul. 20, 2017 and International Application PCT/US17/036542 filed Jun. 8, 2017 and International Application WO2018129015, international application WO2018148407, international application WO2018183810, international application WO2018175362, international application WO2018194961, international application WO2018200660, international application WO2019013868, international application WO2019100085, international application WO2020068285, international application WO2020176479, and international application WO2021034793.

BACKGROUND OF THE INVENTION

Injection molding systems have been developed for injecting fluid flow simultaneously during at the filling stage into two or more mold cavities held or clamped by a single clamp device.

SUMMARY OF THE INVENTION

In accordance with the invention there is provided an injection molding apparatus (10a) comprising an injection molding machine (500) that injects a selected fluid (18) to a distribution manifold (800) that has a distribution channel (160) that commonly routes the injection fluid (18) to:

one or more first downstream channels (166, 166a, 166b) and associated first gates (34, 34a, 34b) that deliver the injection fluid (18) to a first cavity (300a) of a mold system (302, 303) and, one or more second downstream channels (168, 168a, 168b) and associated second gates (32, 32a, 32b) that deliver the injection fluid to a second cavity (300b) of the mold system (302, 303), the mold system (302, 302) being clamped together under a selected clamp force by a clamp device (700), the apparatus including a first upstream valve (118) that enables and disables flow of the injection fluid from the distribution channel (160) to the first gates (34, 34a, 34b) and a second upstream valve (108) that enables and disables flow of the injection fluid from the distribution channel (160) to the one or more second gates (32, 32a, 32b), the apparatus further including a control system (20) adapted to instruct the first upstream valve (118) to open or enable flow of the injection fluid (18) to the one or more first gates (34, 34a, 34b) at a first selected time and to further instruct the second upstream valve (108) to open or enable flow of the injection fluid (18) to the one or more second gates (32, 32a, 32b) at a second selected time that is delayed, subsequent or sequential in time relative to the first selected time during the course of an injection cycle.

In such an apparatus, the second selected time is selected such that a first peak injection fluid force or pressure that occurs within the first cavity (300a) during an injection cycle occurs at a first peak time that is offset from a second peak time at which a second peak injection fluid force or pressure occurs within the second cavity (300b) during the injection cycle.

In such an apparatus, the second selected time is selected such that a maximum cumulative fluid force or pressure that occurs within the first and second cavities (300a, 300b) during an injection cycle is less than a cumulation of the first and second peak injection fluid forces or pressures.

In such an apparatus the second selected time is selected such that a first pack phase injection fluid force or pressure that occurs within the first cavity (300a) during an injection cycle occurs at a first pack phase time that is offset from a second pack phase time at which a second pack phase injection fluid force or pressure occurs within the second cavity (300b) during the injection cycle.

In such an apparatus, injection fluid (18) is injected into the first and second cavities (300a, 300b) first under a filling phase pressure or force and subsequently under a pack phase pressure or force, the filling phase pressure or force being substantially less than the pack phase pressure or force.

In such an apparatus the selected clamp force is typically selected to at least equal a cumulative peak force or pressure exerted by the injection fluid (18) within the first and second cavities (300a, 300b) over the course of an injection cycle.

In such an apparatus, one or more first downstream valves (150b) control delivery of the injection fluid (18) through the first downstream channels (166, 166a, 166b) and associated first gates (34, 34a, 34b) and one or more second downstream valves (150a) control delivery of the injection fluid (18) through the second downstream channels (168, 168a, 168b) and associated second gates (32, 32a, 32b).

The second selected time is typically selected such that a time during the injection cycle at which the injection fluid exerts a peak force or pressure within the first cavity is substantially offset from a time during the injection cycle at which the injection fluid exerts a peak force or pressure within the second cavity.

The second selected time is typically selected such that the selected force of the clamp device is significantly reduced relative to a force equal to a combined peak force or pressure exerted by the injection fluid (18) within the first and second cavities (300a, 300b) where injection fluid (18) is delivered to the first (34, 34a, 34b) and second (32, 32a, 32b) downstream gates simultaneously.

In such an apparatus, one or more of the first and second downsteam valves (150a, 150b) typically comprise an actuator (50, 50b) interconnected to a valve pin (1041, 1041a) having a control surface (755, 1155) having a selected configuration adapted to cooperate with a selected complementary surface (765, 1254) of a downstream channel (166, 168) such that the rate of flow of injection fluid (18) is controllable by controlling axial positioning of the control surface (755, 1155) of the valve pin relative to the selected complementary surface (765, 1254) of a downstream channel (166, 168).

In such an apparatus, the controller (20) can include instructions that control timing of opening of the upstream valves (108, 108s, 118), 118s) such that the upstream valves (108, 108s, 118, 118s) are controllably opened to deliver fluid (18) to and fill the mold cavities (300a, 300b) at and over different or staggered times during an injection cycle.

In such an apparatus, the controller (20) can include instructions that control a degree of openness of the upstream valves (108, 108s, 118, 118s) at selected times over the course of an injection cycle such that the upstream valves are controllably opened to deliver fluid (18) to and fill the mold cavities (300a, 300b) at different selected rates over the course of an injection cycle.

The controller (20) can include an algorithm that receives fluid pressure data from one or more pressure sensors (60a, 80a) that measure fluid pressure at a selected position disposed within an upstream distribution channel (162, 164).

The algorithm included within the controller (20) can include a memory that stores a predetermined profile of fluid pressures for the selected positions at which the sensors (60a, 80a) measure pressure and include instructions that instruct the upstream valves (108s, 118s) to open to a degree over the course of an injection cycle that effects a fluid pressure at the selected positions that matches the predetermined profile of pressures over the course of an injection cycle.

The controller (20) can be interconnected to and receive fluid pressure data from one or more pressure sensors (80c) that measure fluid pressure within a downstream fluid channel (166, 168) at a position (166ua) disposed upstream and away from the gates (32, 34), the controller (20) including a memory that stores a predetermined profile of fluid pressures for the upstream and away from the gate positions (166ua) and instructions that instruct a downstream actuator (50a, 50b) to axially position an interconnected valve pin (1041, 1041) having a pin surface (755) adapted to interact with a complementary channel surface (765) to effect a fluid pressure at the upstream and away from the gate position (166ua) that matches predetermined profile of fluid pressures for the upstream and away from the gate positions (166ua).

The controller (20) can receives fluid pressure data from one or more pressure sensor (60c) that measure fluid pressure at a position within a cavity (300a, 300b) and a memory that stores a predetermined profile of fluid pressures for the positions at which one or more pressure sensors (60c) measure pressure and further include instructions that instruct a downstream actuator (50a, 50b) to axially move a valve pin (1041, 1041a) having a surface (1155) adapted to interact with a complementary gate surface (1254) to control fluid pressure at the positions at which the one or more pressure sensors (60c) measure pressure, the controller (20) including instructions that instruct the actuators to move the valve pins (1041, 1041a) to positions such that the pressure of fluid at the positions of the pressure sensors (60c) matches the pressures of the predetermined profile.

The controller can include instructions that instruct the downstream actuators (50a, 50b) to control the sequence or timing of injection fluid flow via control of axial positioning of the valve pins (1041, 1041a).

In another aspect of the invention there is provided a method of performing an injection cycle in an injection molding machine (500) comprised of a distribution manifold (800), the method comprising:

routing an injection fluid (18) via a common distribution channel (160) to:

one or more first downstream channels (166, 166a, 166b) and associated first gates (34, 34a, 34b) that deliver the injection fluid (18) to a first cavity (300a) of a mold system (302, 303) and, routing the injection fluid (18) to one or more second downstream channels (168, 168a, 168b) and associated second gates (32, 32a, 32b) that deliver the injection fluid to a second cavity (300b) of the mold system (302, 303), clamping the mold system (302, 302) together under a selected clamp force with a clamp device (700), enabling and disabling flow of the injection fluid (18) from the distribution channel (160) to the first gates (34, 34a, 34b) via a first upstream valve (118) and enabling and disabling flow of the injection fluid from the distribution channel (160) to the one or more second gates (32, 32a, 32b) via a second upstream valve (108), instructing the first upstream valve (118) to open or enable flow of the injection fluid (18) to the one or more first gates (34, 34a, 34b) at a first selected time, and, instructing the second upstream valve (108) to open or enable flow of the injection fluid (18) to the one or more second gates (32, 32a, 32b) at a second selected time that is delayed, subsequent or sequential in time relative to the first selected time during the course of an injection cycle.

In another aspect the invention there is provided an injection molding apparatus (10a) comprising an injection molding machine (500) that injects a selected fluid (18) to a distribution manifold (800) that routes the injection fluid (18) to:

one or more first downstream channels (166, 166a, 166b) and associated first gates (34, 34a, 34b) that deliver the injection fluid (18) to a first cavity (300a) of a mold system (302, 303) and, one or more second downstream channels (168, 168a, 168b) and associated second gates (32, 32a, 32b) that deliver the injection fluid to a second cavity (300b) of the mold system (302, 303), the mold system (302, 302) being clamped together under a selected clamp force by a clamp device (700), the apparatus (10a) being adapted to enable flow of the injection fluid (18) to the one or more first gates (34, 34a, 34b) at a first selected time and to further enable flow of the injection fluid (18) to the one or more second gates (32, 32a, 32b) at a second selected time that is delayed, subsequent or sequential in time relative to the first selected time during the course of an injection cycle.

In such an apparatus, the second selected time is selected such that a first peak injection fluid force or pressure that occurs within the first cavity (300a) during an injection cycle occurs at a first peak time that is offset from a second peak time at which a second peak injection fluid force or pressure occurs within the second cavity (300b) during the injection cycle.

In such an apparatus, the second selected time is selected such that a maximum cumulative fluid force or pressure that occurs within the first and second cavities (300a, 300b) during an injection cycle is less than a cumulation of the first and second peak injection fluid forces or pressures.

In such an apparatus the second selected time is selected such that a first pack phase injection fluid force or pressure that occurs within the first cavity (300a) during an injection cycle occurs at a first pack phase time that is offset from a second pack phase time at which a second pack phase injection fluid force or pressure occurs within the second cavity (300b) during the injection cycle.

In such an apparatus, injection fluid (18) is injected into the first and second cavities (300a, 300b) first under a filling phase pressure or force and subsequently under a pack phase pressure or force, the filling phase pressure or force being substantially less than the pack phase pressure or force.

In another aspect of the invention there is provided a method of performing an injection cycle comprising operating any of the apparatuses described herein to perform an injection cycle.

In another aspect of the invention there is provided a method of performing an injection cycle in an injection molding machine (500) comprised of a distribution manifold (800), the method comprising:

routing an injection fluid (18) via a common distribution channel (160) to:
one or more first downstream channels (166, 166a, 166b) and associated first gates (34, 34a, 34b) that deliver the injection fluid (18) to a first cavity (300a) of a mold system (302, 303) and,
routing the injection fluid (18) to one or more second downstream channels (168, 168a, 168b) and associated second gates (32, 32a, 32b) that deliver the injection fluid to a second cavity (300b) of the mold system (302, 303),
clamping the mold system (302, 302) together under a selected clamp force with a clamp device (700),
enabling and disabling flow of the injection fluid (18) from the distribution channel (160) to the first gates (34, 34a, 34b) at a first selected time,
and enabling and disabling flow of the injection fluid from the distribution channel (160) to the one or more second gates (32, 32a, 32b) at a second selected time that is delayed, subsequent or sequential in time relative to the first selected time during the course of an injection cycle.

Such a method can include selecting the second selected time such that a first peak injection fluid force or pressure that occurs within the first cavity (300a) during an injection cycle occurs at a first peak time that is offset from a second peak time at which a second peak injection fluid force or pressure occurs within the second cavity (300b) during the injection cycle.

Such a method can include selecting the second selected time such that a maximum cumulative fluid force or pressure that occurs within the first and second cavities (300a, 300b) during an injection cycle is less than a cumulation of the first and second peak injection fluid forces or pressures.

Such a method can include selecting the second selected time such that a first pack phase injection fluid force or pressure that occurs within the first cavity (300a) during an injection cycle occurs at a first pack phase time that is offset from a second pack phase time at which a second pack phase injection fluid force or pressure occurs within the second cavity (300b) during the injection cycle.

Such a method can include injecting the injection fluid (18) into the first and second cavities (300a, 300b) first under a filling phase pressure or force and subsequently under a pack phase pressure or force, the filling phase pressure or force being substantially less than the pack phase pressure or force

DETAILED DESCRIPTION OF THE INVENTION

FIGS. 1A, 1B, 2A, 2B, 3A, 3B, 4A, 4B, 5A, 5B illustrate the clamp force and injection fluid densities within a mold cavity that can occur over the course of an injection cycle using different injection protocols in the operation of an injection molding system comprised of a mold system having two or more separate cavities that are both clamped by a single clamp device.

In the context of the present disclosure, an injection cycle is the injection of a selected fluid into at least first and second selected mold cavities over a duration of time such that the selected injection fluid fills or substantially fills both the at least first and second selected mold cavities. For clarity, an injection cycle includes injection of fluid into a first selected cavity and filling or substantially filling the first selected cavity prior to completion of filling or substantially filling the second selected cavity. Filling or substantially filling a mold cavity includes injecting the injection fluid such that the injection fluid follows any profile of variable or varying fluid pressures exerted within a mold cavity or any profile of variable or varying flow velocities into the mold cavity over the duration of the injection cycle. A profile can include any one or a combination in any sequence of what may be referred to as high pressures, spike pressures, high flow velocities, fill pressures, fill velocities, low pressures, low flow velocities, low fill pressures, low fill velocities, pack pressures, pack velocities, and the like.

Figure 1A:
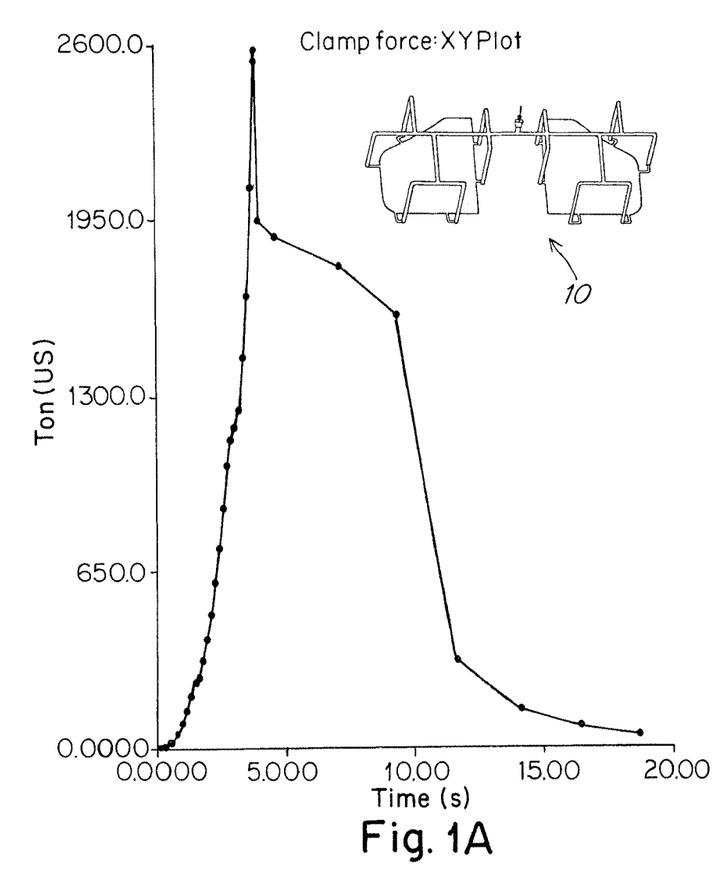
FIG. 1A is a plot of clamp force versus time that is required and occurs during an injection cycle in a system comprised of first and second mold cavities held within a common or single clamp device and where each cavity is separately gated by first and second gate systems each gate system being comprised of two or more gates that are sequentially opened to fill each cavity, and where each gate system is simultaneously fed or opened during a filling stage.
Figure 1B:
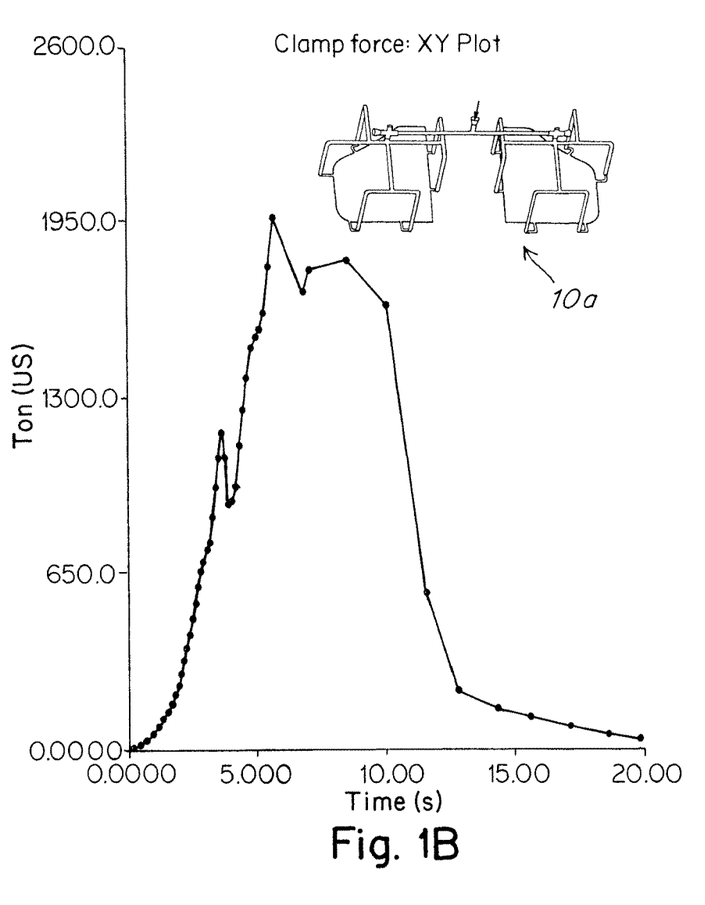
FIG. 1B is a plot of clamp force versus time that is required and occurs during an injection cycle in the system comprised of the same pair of mold cavities as in FIG. 1A held within the same common or single clamp device where each gate system to the pair of mold cavities is fed or opened during the filling stage for each cavity in a time sequenced or sequential manner such that the clamp forced required to hold the cavities closed is substantially reduced relative to the clamp force required to carry out the simultaneous process resulting in the FIG. 1 plot.

Shown on the right in FIGS. 1B, 2B, 3B, 4B, 5B is a clamp force plot, FIG. 1B and injection fluid density maps, FIGS. 2B, 3B, 4B, 5B that result at serial stages and times during an injection cycle where the pair of mold cavities are clamped or held within a single clamp device and are sequentially in time fed by or opened to fluid injection at or during the filing stage of an injection cycle, the source of injection fluid flow to each mold cavity being distributed from a common or single heated manifold. Shown on the left in FIGS. 1A, 2A, 3A, 4A, 5A is a clamp force plot, FIG. 1A and injection fluid density maps, FIGS. 2A, 3A, 4A, 5A that result at various serial or subsequent times during an injection cycle where the pair of mold cavities are fed by or opened to fluid injection simultaneously and not sequentially during the filling stage by a common or single heated manifold system.

Figure 2A:
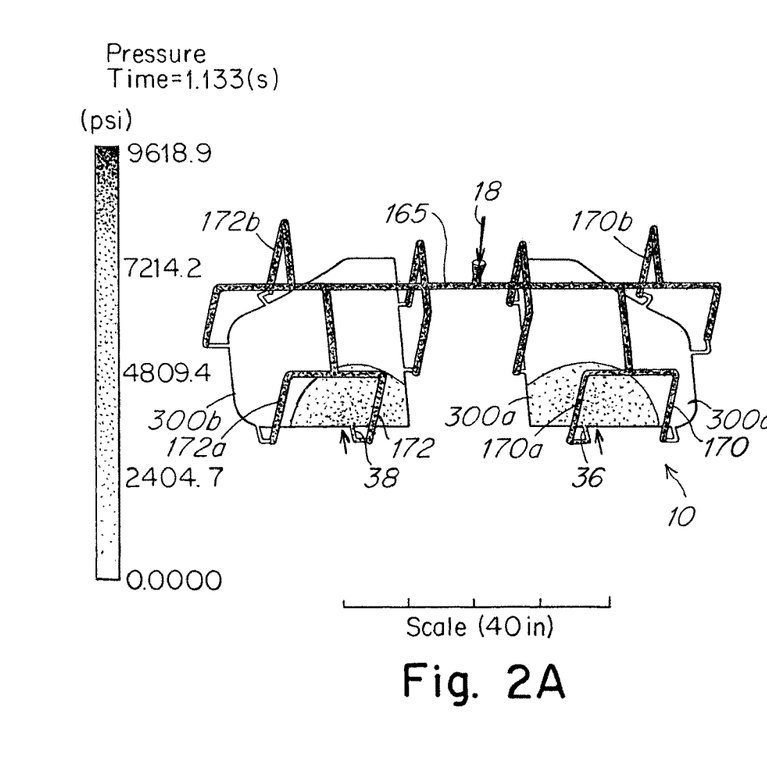
FIG. 2A is a schematic plot of injection fluid density flow and a recordation of cavity pressure recorded at a selected time around or near the beginning of the injection cycle performed using the first and second cavity system of FIGS. 1A, 1B and the simultaneous opening or feeding of the first and second gate systems during the filling stage used to generate the plot of FIG. 1A.
Figure 2B:
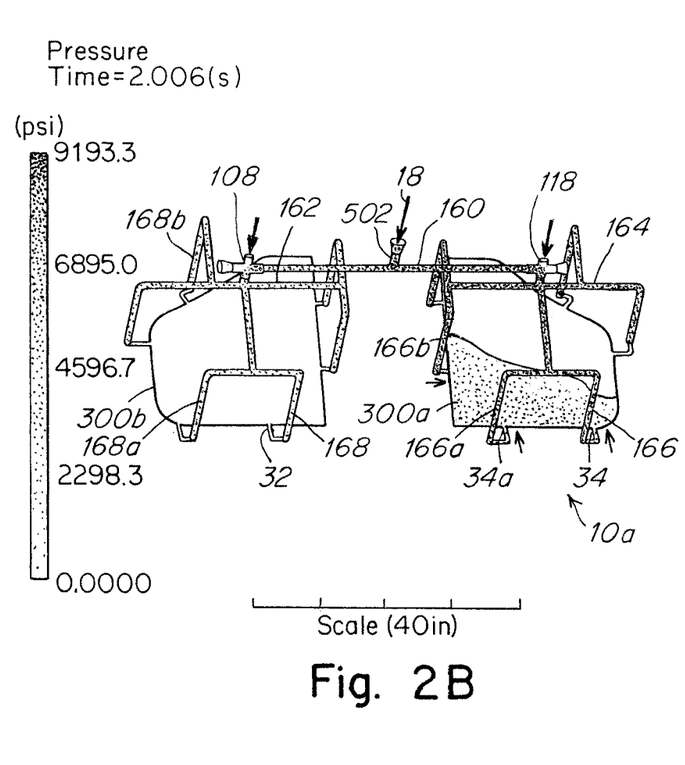
FIG. 2B is a schematic plot of injection fluid density flow and a recordation of cavity pressure recorded at another selected time around or near the beginning of the injection cycle performed using the first and second cavity system of FIGS. 1A, 1B and the sequential opening or feeding of the first and second gate systems during the filling stage used to generate the plot of FIG. 1B.
Figure 3A:
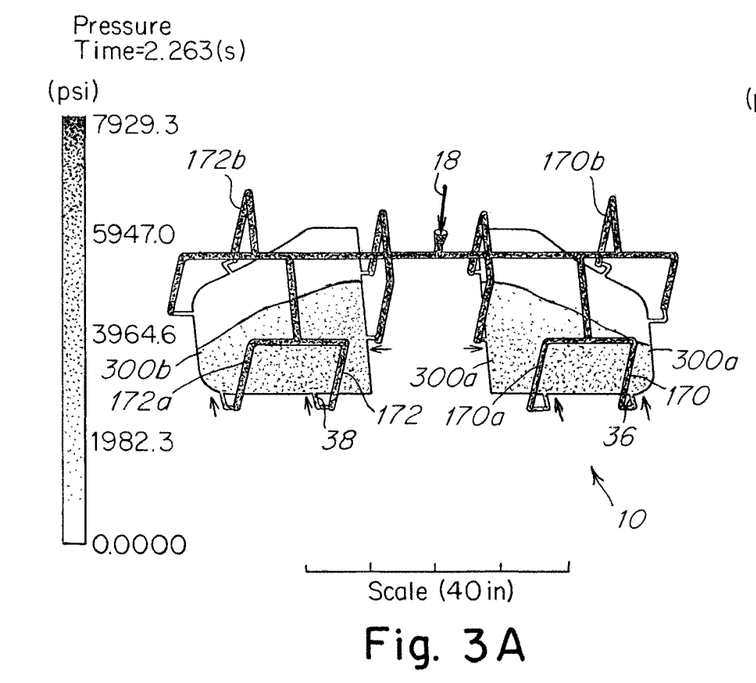
FIG. 3A is a schematic plot of injection fluid density flow and a recordation of cavity pressure recorded at a selected second subsequent time during the injection cycle performed using the first and second cavity system of FIGS. 1A, 1B and the simultaneous opening or feeding of the first and second gate systems during the filling stage used to generate the plot of FIG. 1A.
Figure 3B:
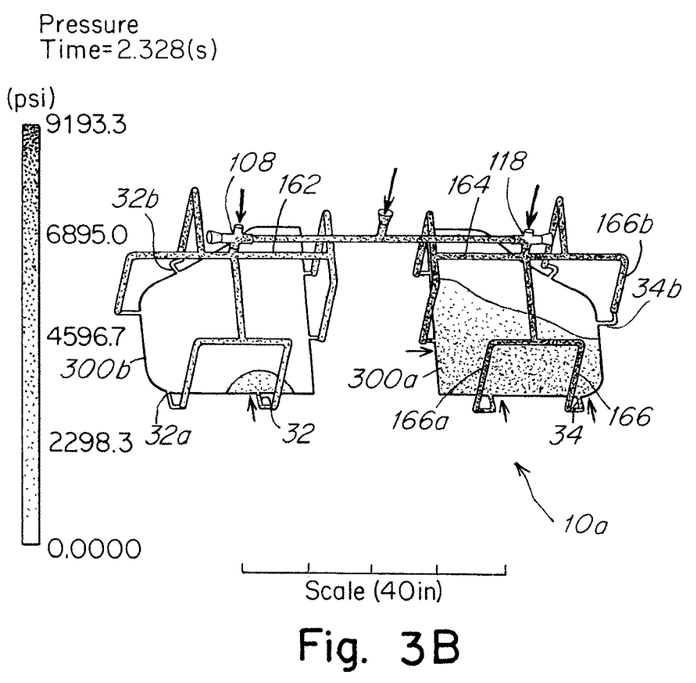
FIG. 3B is a schematic plot of injection fluid density flow and a recordation of cavity pressure recorded at another selected second subsequent time during the injection cycle performed using the first and second cavity system of FIGS. 1A, 1B and the sequential opening or feeding of the first and second gate systems during the filling stage used to generate the plot of FIG. 1B.
Figure 4A:
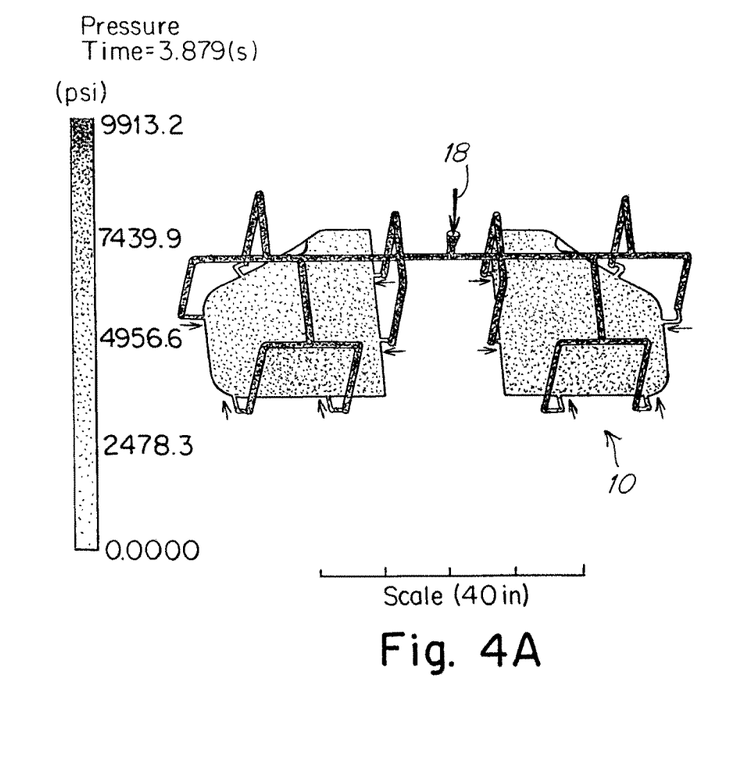
FIG. 4A is a schematic plot of injection fluid density flow and a recordation of cavity pressure recorded at a selected third subsequent time during the injection cycle performed using the first and second cavity system of FIGS. 1A, 1B and the simultaneous opening or feeding of the first and second gate systems during the filling stage used to generate the plot of FIG. 1A.
Figure 4B:
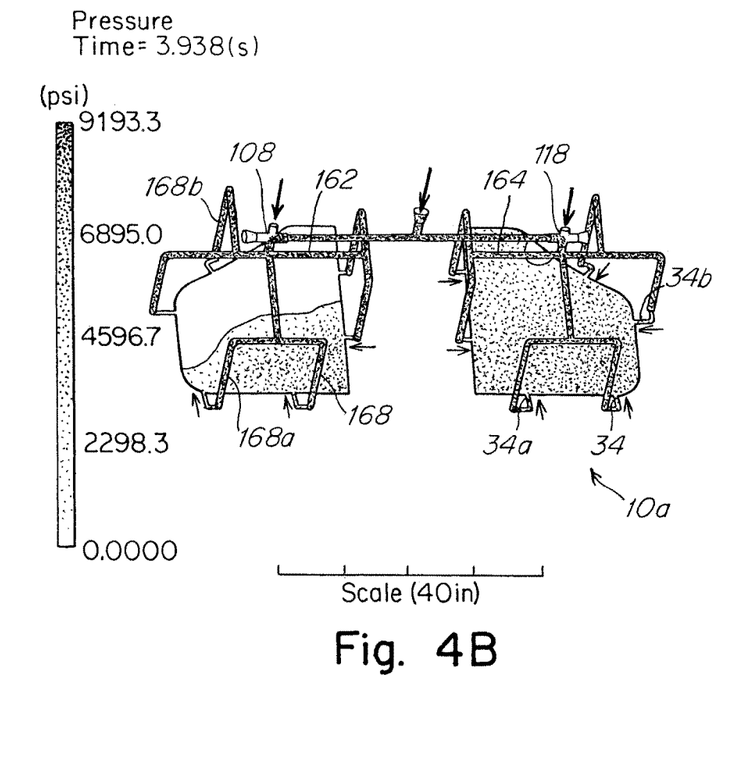
FIG. 4B is a schematic plot of injection fluid density flow and a recordation of cavity pressure recorded at another selected third subsequent time during the injection cycle performed using the first and second cavity system of FIGS. 1A, 1B and the sequential opening or feeding of the first and second gate systems during the filling stage used to generate the plot of FIG. 1B.

The injection protocol used to generate the plots and maps of FIGS. 1A, 2A, 3A, 4A, 5A, is typically used in a conventional hot runner injection system process or protocol that doesn't utilize sequentially controlled upstream valves. As shown by FIGS. 1B, 2B, 3B, 4B, 5B, using a cavity isolator system, method and protocol according to the invention enables the implementation of a stable and reproducible predetermined profile of cavity or fluid delivery channel pressure that can be selectively different for each cavity during a single injection cycle. A first mold cavity can be substantially completely filled and enter a packing stage (which typically requires uniform pressure distribution) while injection of fluid to a second mold cavity during the same injection cycle can be carried out such that the second mold cavity is still in process of filling after the first mold cavity has already been substantially filled. This sequential in time mold cavity filling process enables the peak clamp force required for clamping or holding each mold at its peak stage of required fill pressure to be offset, reducing the size of the pressure spike seen in the left FIG. 1A that occurs when using a simultaneous injection to both cavities 300a, 300b during the filling stage in the system and method shown in FIGS. 2A, 3A, 3A, 4A. In a conventional manifold system and injection protocol as shown in FIGS. 2A, 3A, 3A, 4A, a downstream programmed injection protocol that separately controls injection sequentially downstream through one set of downstream gates 36 for one of the two cavities 300a would disturb the desired injection fluid pressure distribution within the other cavity 300b via the other set of gates 38 causing aesthetic defects and flow front stagnation.

Figure 5A:
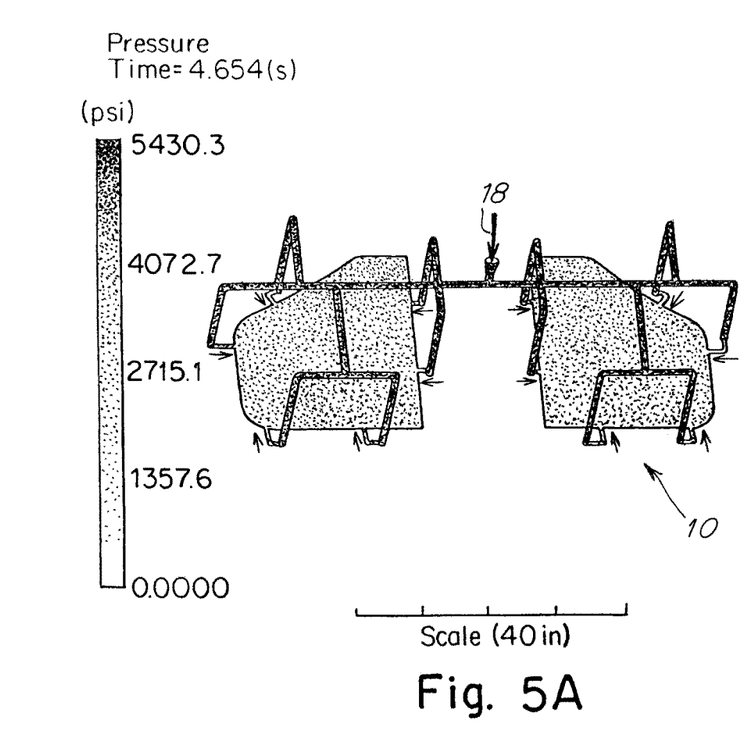
FIG. 5A is a schematic plot of injection fluid density flow and a recordation of cavity pressure recorded at a selected fourth subsequent time during the injection cycle performed using the first and second cavity system of FIGS. 1A, 1B and the simultaneous opening or feeding of the first and second gate systems during the filling stage used to generate the plot of FIG. 1A.
Figure 5B:
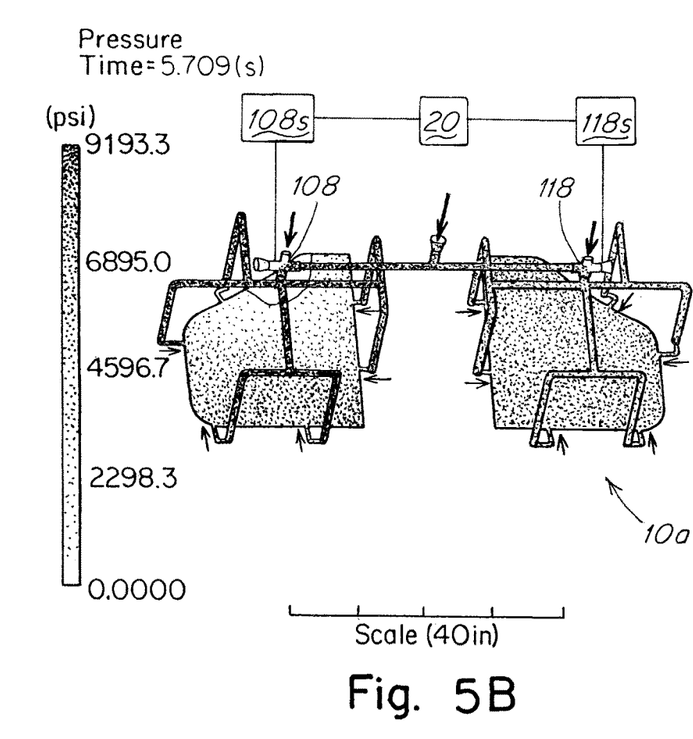
FIG. 5B is a schematic plot of injection fluid density flow and a recordation of cavity pressure recorded at another selected fourth subsequent time during an injection cycle performed using the first and second cavity system of FIGS. 1A, 1B and the sequential opening or feeding of the first and second gate systems during the filling stage used to generate the plot of FIG. 1B.

As shown in FIG. 1A a spike of 2600 tons of clamp force is required to clamp against the cumulative fluid force or pressure that occurs within the two mold cavities 300a, 300b of the FIGS. 2A, 3A, 4A, 5A system and method of simultaneous injection. As shown such a spike occurs at about the time of 4.6 seconds where as shown in FIG. 5A the two cavities 300a, 300b are simultaneously in a pack phase at about 4.6 seconds during the course of an injection cycle. Such a simultaneous occurrence of peak fluid force or pressure within both cavities 300a, 300b is avoided in the sequentially filled cavity system and method of FIGS. 2B, 3B, 4B, 5B where the peak clamping force required during the injection cycle is about 2000 tons occurs at about 5.2 seconds at which the two mold cavities 300a, 300b are at significantly different stages of being filled. Thus in the sequentially filled system of FIGS. 2B, 3B, 4B, 5B the times at which a peak fluid force or pressure occurs within the two cavities are offset and the cumulative peak force or pressure that occurs with the two cavities is significantly reduced relative to the cumulative peak force or pressure that occurs in the system of FIGS. 2A, 3A, 4A, 5A.

Figure 6:
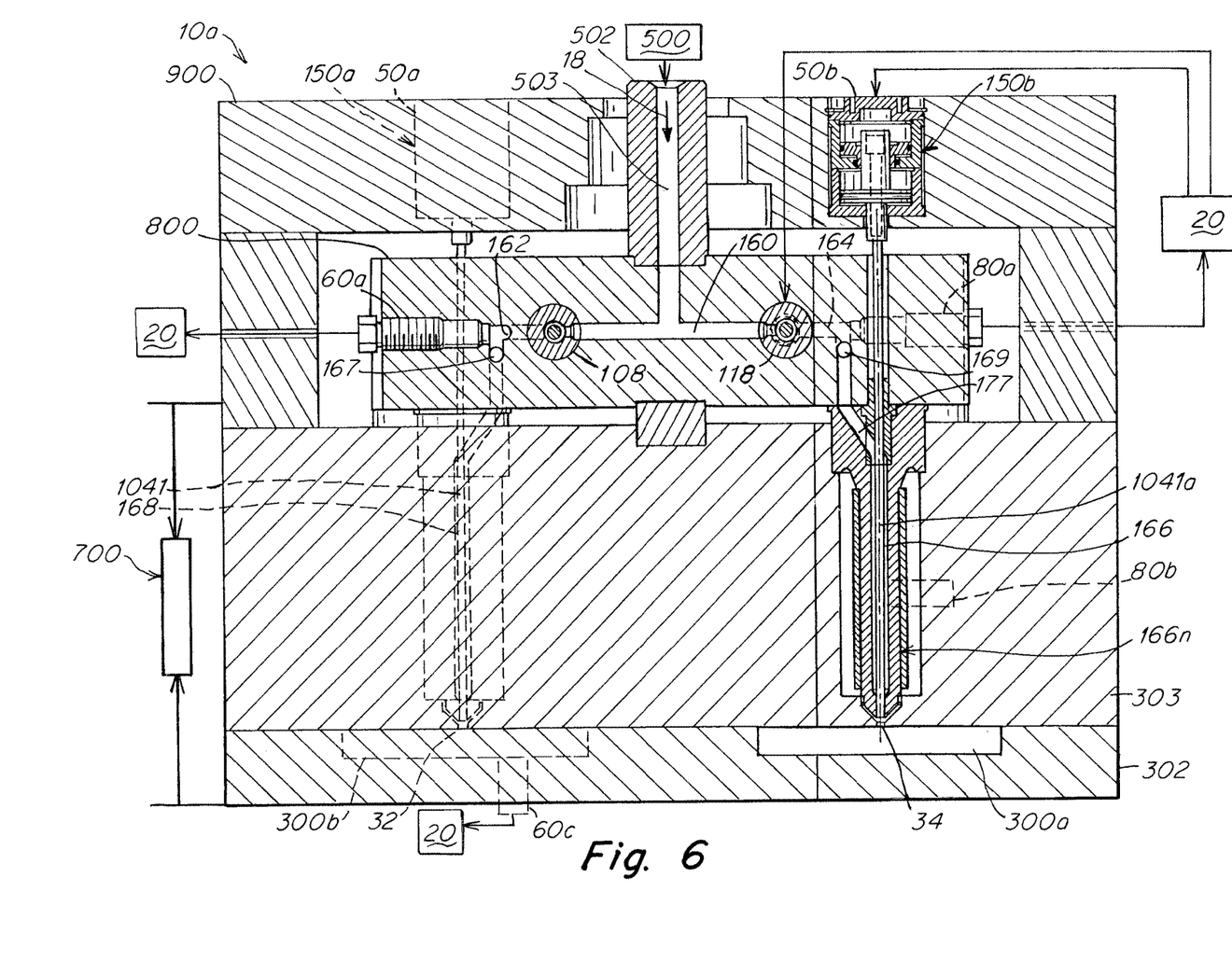
FIG. 6 is a side sectional schematic view of an injection molding apparatus according to the invention that includes a pair of upstream valves 108, 188 that are controlled to sequentially open or feed injection fluid 18 to separately controlled gates or gate systems 34,32 that deliver the injection fluid to first 300a and second 300b mold cavities, the upstream valves 108, 118 receiving a pressurized input of injection fluid 18 from the barrel of an injection molding machine 500.

FIG. 6 shows an injection molding apparatus 10*a* according to the invention that includes a pair of upstream valves 108, 118 that are interconnected to or controlled by a programmed controller 20 that controllably opens a pair of upstream valves 108, 118 that control the relative timing and the rate of fluid delivery to the downstream channels 166, 166*a*, 166*b*, 168, 168*a*, 168*b* and their associated gates 32, 32*a*, 32*b*, 34, 34*a*, 34*b*. The controlled upstream valves 108, 118 are controlled by controller 20 to begin an injection cycle in a predetermined sequence of time such that one of the valves 118 opens first to deliver injection fluid 18 at a first predetermined time to a first system of gates 34, 34*a*, 34*b* to a first mold cavity 300*a* and such that the other of the upstream valves 108 opens to deliver injection fluid 18 at a second subsequent predetermined time to a system of gates 32, 32*a*, 32*b* to a second mold cavity 300*b*. As shown the two mold cavities are mounted or clamped in a clamp device 700. The clamp device 700 holds the mold plates 302, 303 together under high force or pressure against the opposing high pressure of injection fluid 18 injected into the cavities 300*a*, 300*b* thus maintaining both of the cavities 300*a*, 300*b* closed at the same time during the course of an injection cycle.

As shown in schematic in FIGS. 2B, 3B, 4B, 5B, 6, injection fluid 18 is fed through the feed channel 503 of an inlet 502 to a heated manifold or hotrunner 800 that commonly feeds or delivers fluid 18 to the first and second cavities 300*a* and 300*b*. The manifold 800 includes an upstream runner channel 160 that is interconnected to and commonly feeds or delivers injection fluid 18 to downstream distribution channels 162, 164 that separately feed or deliver fluid 18 a first set of downstream feed channels 166, 166*a*, 166*b* and a second set of downstream feed channels 168, 168*a*, 168*b* respectively.

The upstream channel 160 first delivers the fluid 18 to the downstream distribution channels 162, 164 via controllable opening of the upstream valves 108, 118. One of the valves 108, 118 is first opened at a first time to enable flow of injection fluid 18 to a first set of downstream fluid channels and associated gates and the other of the valves 108, 118 is opened at a second subsequent time to enable flow of fluid 18 to the second set of downstream channels and associated gates. The valves 108, 118 can be further controlled by or comprise a servo valve or equivalent device 108*s*, 118*s* that can be controlled by controller 20 to open one or the other or both of the upstream valves 108*s*, 118*s* a selected degree of openness between 0 and 100% such that the rate of flow of injection fluid 18 can be controlled between 0 and 100% of the maximum rate of flow of the fluid. In such an embodiment controller 20 can be programmed to both open the upstream valves 108, 108*s*, 118, 118*s* at different or staggered time but also to selected degrees of openness over the course of an injection cycle. The controller can include an algorithm that receives fluid pressure data from pressure sensors such as sensors 60*a*, 80*a* that measure fluid pressure at a position within an upstream distribution channel 162, 164 that is disposed upstream and away from the gates 32, 34. The algorithm included within the controller 20 can include a memory that stores a predetermined profile of preferred fluid pressures at the positions at which sensors 60*a*, 80*a* are disposed and record pressure and the controller can included instructions that instruct the servo or other electronically controllable valves 108*s*, 118*s* to controllably open to a degree over the course of an injection cycle that results in a fluid pressure according to the stored profile of pressures at the location of the sensors 60*a*, 80*a*.

Similarly the controller 20 can include an algorithm that receives fluid pressure data from pressure sensors such as sensors 80*c* that that measure fluid pressure within a downstream fluid channel 166, 168 at a position 166*ua* disposed upstream and away from the gates 32, 34. The algorithm included within the controller 20 can include a memory that stores a predetermined profile of preferred fluid pressures at the positions at which sensors 80*c* are disposed and record pressure and the controller can further include instructions that instruct an actuator 50*a*, 50*b* that is interconnected to a valve pin 1041, 1041*a* having a configuration such as shown in FIG. 7 to move the pin surface 755 to axial positions relative to the complementary channel surface 765 that create a fluid pressure at the upstream channel position 166*a* that creates a fluid pressure that matched a stored predetermined profile of pressures at the location of position 166*a*.

Similarly the controller 20 can include an algorithm that receives fluid pressure data from pressure sensors such as sensors 60*c* that that measure fluid pressure at a position within a cavity 300*a*, 300*b* such as at a position disposed at or near the gates 32, 34. The algorithm included within the controller 20 can include a memory that stores a predetermined profile of preferred fluid pressures at the positions at which sensors 60*c* are disposed and record pressure during the course of an injections and the controller 20 can further include instructions that instruct an actuator 50*a*, 50*b* to move a valve pin 1041, 1041*a* having a configuration such as shown in either FIG. 7 or FIGS. 8A, 8B to move the pin 1041*a* axially to either position the surface 755 at axial positions relative to the complementary channel surface 765, or to position the valve tip surface 1155 relative to gate surface 1254 that create a fluid pressure at the position of the cavity sensors 60*c* that creates a fluid pressure that matches a stored predetermined profile of pressures at the position or location of sensors 60*c*.

In addition to a time sequence of fluid delivery as controlled by upstream valves 108*s*, 118*s*, the time sequence of delivery of injection fluid 18 through the downstream feed channels 166, 166*a*, 166*b* and 168, 168*a*, 168*b* can be further separately controlled by controlling the operation of actuators 50*a*, 50*b* that are associated with each feed channel 166, 166*a*, 166*b* and 168, 168*a*, 168*b*. The actuators 50*a*, 50*b* are interconnected to valve pins 1041, 1041*a* that can be configured to interact with either the gate area of gates 32, 34 or with a complementary upstream surface 765 as described with reference to FIGS. 7, 8A, 8B.

Figure 7:
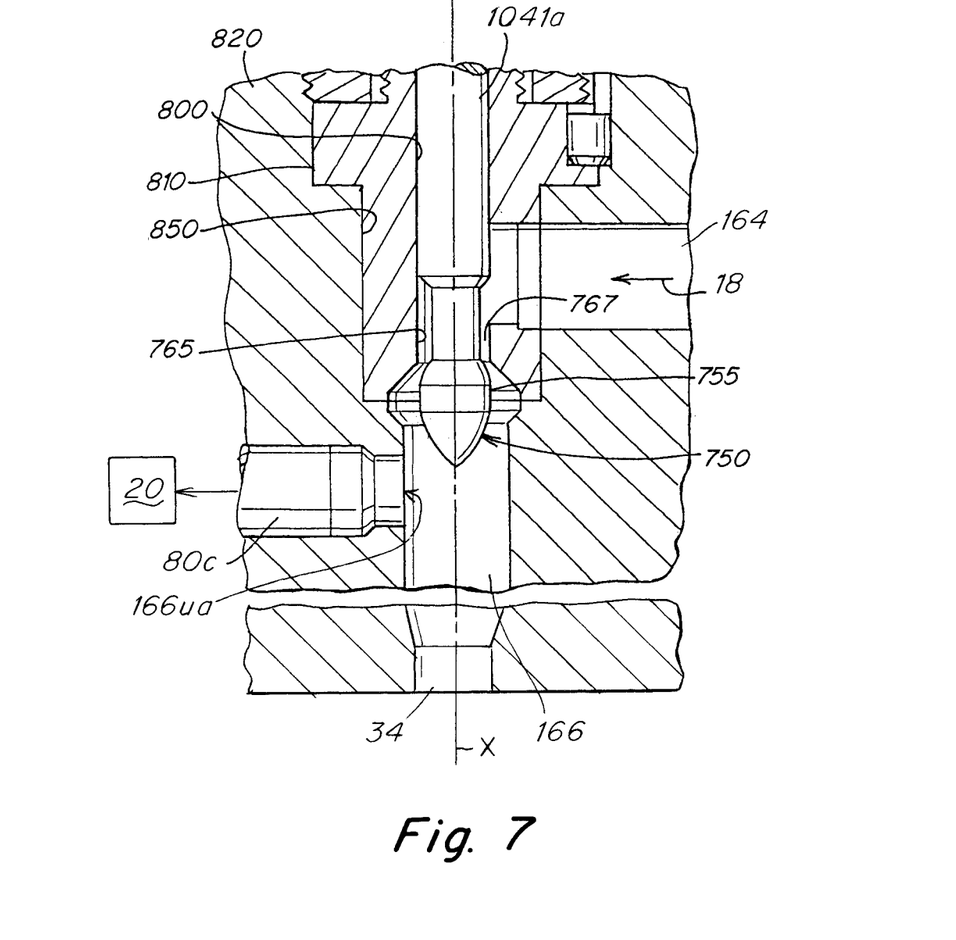
FIG. 7 is a side partial sectional view of an upstream portion or surface 765 of a downstream fluid delivery channel 166 of a gate system 10a where a portion or surface 755 of the valve pin 1041a and the upstream portion or surface 765 of the channel 16 are complementarily configured to interact with each other depending on the axial position of the portion 755 of the valve pin to restrict and control the rate of flow of injection fluid 18 through the downstream channel and gate 34.

As shown in FIG. 7, the axial position of a valve pin 1041*a*, 1041 can be controlled to position a portion or surface 755 of the valve pin 1041*a* relative to a complementary portion or surface 765 of a downstream fluid delivery channel 166 that is disposed at a position 166*ua* upstream and away from the gate such that fluid flow through or past the surface 765 is controllably restricted to a selected rate of flow. As shown the portion or surface 755 of the valve pin 1041*a* and the upstream portion or surface 765 of the channel 16 are complementarily configured to interact with each other depending on the axial position of the portion 755 of the valve pin to restrict and control the rate of flow of injection fluid 18 past the surface 765 and thus also through the downstream channel 166 and gate 34. Such FIG. 8A is a side partially sectional schematic view of the downstream end of a downstream fluid delivery channel 166 having a gate surface area 1254 and a valve pin tip end surface 1155 complementarily configured to interact with each other depending on the axial position of the tip end surface 1155 to restrict and control the rate of injection fluid 18 through the downstream channel 166 and gate 34, the tip end surface 1155 being engaged and in contact with the gate surface area 1254 to close the gate 34 such that fluid flow is stopped.

Figure 8A:
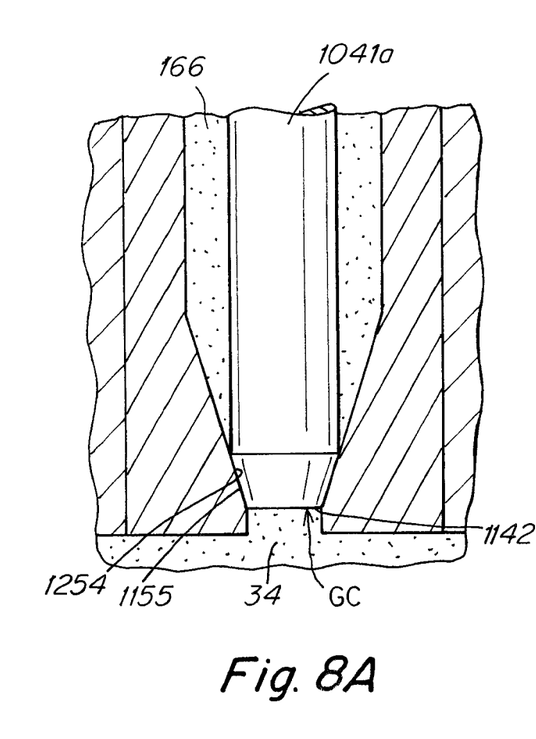
FIG. 8A is a side partially sectional schematic view of the downstream end of a downstream fluid delivery channel 166 having a gate surface area 1254 and a valve pin tip end surface 1155 complementarily configured to interact with each other depending on the axial position of the tip end surface 1155 to restrict and control the rate of injection fluid 18 through the downstream channel 166 and gate 34, the tip end surface 1155 being engaged and in contact with the gate surface area 1254 to close the gate 34 such that fluid flow is stopped.
Figure 8B:
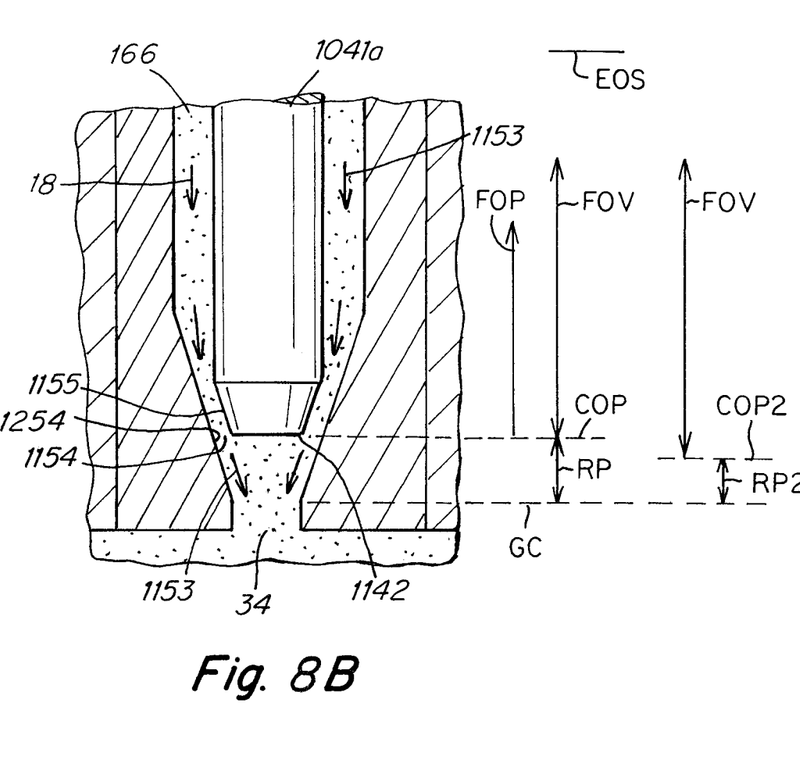
FIG. 8B is a view similar to FIG. 8A showing the tip end surface 1155 being disposed in an axial position relative to the gate surface area 1254 such that fluid flow 1154 can be restricted by controlled downstream or upstream movement of the pin through a path RP, RP2 of travel where the rate of fluid flow 1154 is restricted relative to the rate of flow when the valve pin 1041a is disposed in an upstream position such as an end of stroke EOS position.

FIG. 8B is a view similar to FIG. 8A showing the tip end surface 1155 being disposed in an axial position relative to the gate surface area 1254 such that fluid flow 1154 can be restricted by controlled downstream or upstream movement of the pin through a path RP, RP2 of travel where the rate of fluid flow 1154 is restricted relative to the rate of flow when the valve pin 1041a is disposed in an upstream position such as an end of stroke EOS position.

What is claimed is:

1. An injection molding apparatus (10a) comprising an injection molding machine (500) that injects a selected fluid (18) to a distribution manifold (800) that has a distribution channel (160) that commonly routes the injection fluid (18) to:
   one or more first downstream channels (166, 166a, 166b) and associated first gates (34, 34a, 34b) that deliver the injection fluid (18) to a first cavity (300a) of a mold system (302, 303) and,
   one or more second downstream channels (168, 168a, 168b) and associated second gates (32, 32a, 32b) that deliver the injection fluid to a second cavity (300b) of the mold system (302, 303),
   the mold system (302, 303) being clamped together under a selected clamp force by a clamp device (700),
   the apparatus including a first upstream valve (118) that enables and disables flow of the injection fluid from the distribution channel (160) to the first gates (34, 34a, 34b) and a second upstream valve (108) that enables and disables flow of the injection fluid from the distribution channel (160) to the one or more second gates (32, 32a, 32b),
   the apparatus further including a control system (20) adapted to instruct the first upstream valve (118) to open or enable flow of the injection fluid (18) to the one or more first gates (34, 34a, 34b) at a first selected time and to further instruct the second upstream valve (108) to open or enable flow of the injection fluid (18) to the one or more second gates (32, 32a, 32b) at a second selected time that is delayed, subsequent or sequential in time relative to the first selected time during the course of an injection cycle,
   wherein one or more of first and second downstream valves (150a, 150b) comprise an actuator (50, 50b) interconnected to a valve pin (1041, 1041a) having a control surface (755, 1155) having a selected configuration adapted to cooperate with a selected complementary surface (765, 1254) of a downstream channel (166, 168) such that the rate of flow of injection fluid (18) is controllable continuously over the course of an injection cycle by controlling axial positioning of the control surface (755, 1155) of the valve pin relative to the selected complementary surface (765, 1254) of a downstream channel (166, 168).

2. An apparatus according to claim 1 wherein the second selected time is selected such that a first peak injection fluid force or pressure that occurs within the first cavity (300a) during an injection cycle occurs at a first peak time that is offset from a second peak time at which a second peak injection fluid force or pressure occurs within the second cavity (300b) during the injection cycle.

3. Apparatus according to claim 1 wherein the second selected time is selected such that a maximum cumulative fluid force or pressure that occurs within the first and second cavities (300a, 300b) during an injection cycle is less than a cumulation of the first and second peak injection fluid forces or pressures.

4. Apparatus according to claim 1 wherein the second selected time is selected such that a first pack phase injection fluid force or pressure that occurs within the first cavity (300a) during an injection cycle occurs at a first pack phase time that is offset from a second pack phase time at which a second pack phase injection fluid force or pressure occurs within the second cavity (300b) during the injection cycle.

5. Apparatus according to claim 1 wherein the injection fluid (18) is injected into the first and second cavities (300a, 300b) first under a filling phase pressure or force and subsequently under a pack phase pressure or force, the filling phase pressure or force being substantially less than the pack phase pressure or force.

6. Apparatus according to claim 1 wherein the selected clamp force is selected to be at least equal to a cumulative peak force or pressure exerted by the injection fluid (18) within the first and second cavities (300a, 300b) over the course of an injection cycle.

7. Apparatus according to claim 1 wherein the one or more first downstream valves (150a) control delivery of the injection fluid (18) through the first downstream channels (166, 166a, 166b) and associated first gates (34, 34a, 34b) and the one or more second downstream valves (150b) control delivery of the injection fluid (18) through the second downstream channels (168, 168a, 168b) and associated second gates (32, 32a, 32b).

8. Apparatus according to claim 1 wherein the second selected time is selected such that a time during the injection cycle at which the injection fluid exerts a peak force or pressure within the first cavity is substantially offset from a time during the injection cycle at which the injection fluid exerts a peak force or pressure within the second cavity.

9. Apparatus according to claim 1 wherein the second selected time is selected such that the selected force of the clamp device is significantly reduced relative to a force equal to a combined peak force or pressure exerted by the injection fluid (18) within the first and second cavities (300a, 300b) where injection fluid (18) is delivered to the first (34, 34a, 34b) and second (32, 32a, 32b) downstream gates simultaneously.

10. Apparatus according to claim 1 wherein the controller (20) includes instructions that control timing of opening of the upstream valves (108, 108s, 118), 118s) such that the upstream valves (108, 108s, 118, 118s) are controllably opened to deliver fluid (18) to and fill the mold cavities (300a, 300b) at and over different or staggered times during an injection cycle.

11. Apparatus according to claim 1 wherein the controller (20) includes instructions that control a degree of openness of the upstream valves (108, 108s, 118, 118s) at selected times over the course of an injection cycle such that the upstream valves are controllably opened to deliver fluid (18) to and fill the mold cavities (300a, 300b) at different selected rates over the course of an injection cycle.

12. Apparatus according to claim 1 wherein the controller (20) includes an algorithm that receives fluid pressure data from one or more pressure sensors (60a, 80a) that measure fluid pressure at a selected position disposed within an upstream distribution channel (162, 164).

13. Apparatus according to claim 1 wherein the controller (20) includes a memory that stores a predetermined profile of fluid pressures for selected positions at which sensors (60a, 80a) measure pressure and the controller further includes instructions that instruct the upstream valves (108s, 118s) to open to a degree over the course of an injection cycle that effects a fluid pressure at the selected positions that matches the predetermined profile of pressures over the course of an injection cycle.

14. Apparatus according to claim 1 wherein the controller (20) is interconnected to and receives fluid pressure data from one or more pressure sensors (80c) that measure fluid pressure within a downstream fluid channel (166, 168) at a position (166ua) disposed upstream and away from the gates (32, 34), the controller (20) including a memory that stores a predetermined profile of fluid pressures for the upstream and away from the gate positions (166ua) and instructions that instruct a downstream actuator (50a, 50b) to axially position an interconnected valve pin (1041, 1041) having a pin surface (755) adapted to interact with a complementary channel surface (765) to effect a fluid pressure at the upstream and away from the gate position (166ua) that matches predetermined profile of fluid pressures for the upstream and away from the gate positions (166ua).

15. Apparatus according to claim 1 wherein the controller (20) receives fluid pressure data from one or more pressure sensors (60c) that measure fluid pressure at a position within a cavity (300a, 300b) and a memory that stores a predetermined profile of fluid pressures for the positions at which one or more pressure sensors (60c) measure pressure and further include instructions that instruct a downstream actuator (50a, 50b) to axially move a valve pin (1041, 1041a) having a surface (1155) adapted to interact with a complementary gate surface (1254) to control fluid pressure at the positions at which the one or more pressure sensors (60c) measure pressure, the controller (20) including instructions that instruct the actuators to move the valve pins (1041, 1041a) to positions such that the pressure of fluid at the positions of the pressure sensors (60c) matches the pressures of the predetermined profile.

16. Apparatus according to claim 1 wherein the controller includes instructions that instruct the downstream actuators (50a, 50b) to control the sequence or timing of injection fluid flow via control of axial positioning of the valve pins (1041, 1041a).

17. Method of performing an injection cycle in an injection molding machine (500) comprised of a distribution manifold (800), the method comprising:
routing an injection fluid (18) via a common distribution channel (160) to:
one or more first downstream channels (166, 166a, 166b) and associated first gates (34, 34a, 34b) that deliver the injection fluid (18) to a first cavity (300a) of a mold system (302, 303) and,
routing the injection fluid (18) to one or more second downstream channels (168, 168a, 168b) and associated second gates (32, 32a, 32b) that deliver the injection fluid to a second cavity (300b) of the mold system (302, 303),
clamping the mold system (302, 303) together under a selected clamp force with a clamp device (700),
enabling and disabling flow of the injection fluid (18) from the distribution channel (160) to the first gates (34, 34a, 34b) via a first upstream valve (118) and enabling and disabling flow of the injection fluid from the distribution channel (160) to the one or more second gates (32, 32a, 32b) via a second upstream valve (108),
instructing the first upstream valve (118) to open or enable flow of the injection fluid (18) to the one or more first gates (34, 34a, 34b) at a first selected time, and, instructing the second upstream valve (108) to open or enable flow of the injection fluid (18) to the one or more second gates (32, 32a, 32b) at a second selected time that is delayed, subsequent or sequential in time relative to the first selected time during the course of an injection cycle,
wherein one or more of first and second downstream valves (150a, 150b) comprise an actuator (50, 50b) interconnected to a valve pin (1041, 1041a) having a control surface (755, 1155) having a selected configuration adapted to cooperate with a selected complementary surface (765, 1254) of a downstream channel (166, 168) such that the rate of flow of injection fluid (18) is controllable continuously over the course of an injection cycle by controlling axial positioning of the control surface (755, 1155) of the valve pin relative to the selected complementary surface (765, 1254) of a downstream channel (166, 168).

18. An injection molding apparatus (10a) comprising an injection molding machine (500) that injects a selected fluid (18) to a distribution manifold (800) that routes the injection fluid (18) to:
one or more first downstream channels (166, 166a, 166b) and associated first gates (34, 34a, 34b) that deliver the injection fluid (18) to a first cavity (300a) of a mold system (302, 303) and,
one or more second downstream channels (168, 168a, 168b) and associated second gates (32, 32a, 32b) that deliver the injection fluid to a second cavity (300b) of the mold system (302, 303),
the mold system (302, 303) being clamped together under a selected clamp force by a clamp device (700),
a first upstream valve (118) that enables and disables flow of the injection fluid from the distribution channel (160) to the first gates (34, 34a, 34b) and a second upstream valve (108) that enables and disables flow of the injection fluid from the distribution channel (160) to the one or more second gates (32, 32a, 32b),
wherein one or more of first and second downstream valves (150a, 150b) comprise an actuator (50, 50b) interconnected to a valve pin (1041, 1041a) having a control surface (755, 1155) having a selected configuration adapted to cooperate with a selected complementary surface (765, 1254) of a downstream channel (166, 168) such that the rate of flow of injection fluid (18) is controllable continuously over the course of an injection cycle by controlling axial positioning of the control surface (755, 1155) of the valve pin relative to the selected complementary surface (765, 1254) of a downstream channel (166, 168),
the apparatus (10a) being adapted to enable flow of the injection fluid (18) to the one or more first gates (34, 34a, 34b) at a first selected time and to further enable flow of the injection fluid (18) to the one or more second gates (32, 32a, 32b) at a second selected time that is delayed, subsequent or sequential in time relative to the first selected time during the course of an injection cycle.

19. Apparatus according to claim 18 wherein the second selected time is selected such that a first peak injection fluid force or pressure that occurs within the first cavity (300a)

during an injection cycle occurs at a first peak time that is offset from a second peak time at which a second peak injection fluid force or pressure occurs within the second cavity (300*b*) during the injection cycle.

20. Apparatus according to claim 18 wherein the second selected time is selected such that a maximum cumulative fluid force or pressure that occurs within the first and second cavities (300*a*, 300*b*) during an injection cycle is less than a cumulation of the first and second peak injection fluid forces or pressures.

21. Apparatus according to claim 18 wherein the second selected time is selected such that a first pack phase injection fluid force or pressure that occurs within the first cavity (300*a*) during an injection cycle occurs at a first pack phase time that is offset from a second pack phase time at which a second pack phase injection fluid force or pressure occurs within the second cavity (300*b*) during the injection cycle.

22. Apparatus according to claim 18 wherein injection fluid (18) is injected into the first and second cavities (300*a*, 300*b*) first under a filling phase pressure or force and subsequently under a pack phase pressure or force, the filling phase pressure or force being substantially less than the pack phase pressure or force.

23. A method of performing an injection cycle comprising operating an apparatus according to claim 18 to perform an injection cycle.

24. A method of performing an injection cycle in an injection molding machine (500) comprised of a distribution manifold (800), the method comprising:
routing an injection fluid (18) via a common distribution channel (160) to:
one or more first downstream channels (166, 166*a*, 166*b*) and associated first gates (34, 34*a*, 34*b*) via one or more first downstream valves (150*a*) that deliver the injection fluid (18) to a first cavity (300*a*) of a mold system (302, 303) and,
routing the injection fluid (18) to one or more second downstream channels (168, 168*a*, 168*b*) and associated second gates (32, 32*a*, 32*b*) via one or more second downstream valves (150*b*) that deliver the injection fluid to a second cavity (300*b*) of the mold system (302, 303),
clamping the mold system (302, 303) together under a selected clamp force with a clamp device (700),
enabling and disabling flow of the injection fluid (18) from the distribution channel (160) to the first gates (34, 34*a*, 34*b*) at a first selected time,
and enabling and disabling flow of the injection fluid from the distribution channel (160) to the one or more second gates (32, 32*a*, 32*b*) at a second selected time that is delayed, subsequent or sequential in time relative to the first selected time during the course of an injection cycle,
wherein one or more of first and second downstream valves (150*a*, 150*b*) comprise an actuator (50, 50*b*) interconnected to a valve pin (1041, 1041*a*) having a control surface (755, 1155) having a selected configuration adapted to cooperate with a selected complementary surface (765, 1254) of a downstream channel (166, 168) such that the rate of flow of injection fluid (18) is controllable continuously over the course of an injection cycle by controlling axial positioning of the control surface (755, 1155) of the valve pin relative to the selected complementary surface (765, 1254) of a downstream channel (166, 168).

25. Method according to claim 24 further including selecting the second selected time such that a first peak injection fluid force or pressure that occurs within the first cavity (300*a*) during an injection cycle occurs at a first peak time that is offset from a second peak time at which a second peak injection fluid force or pressure occurs within the second cavity (300*b*) during the injection cycle.

26. Method according to claim 24 further comprising selecting the second selected time such that a maximum cumulative fluid force or pressure that occurs within the first and second cavities (300*a*, 300*b*) during an injection cycle is less than a cumulation of the first and second peak injection fluid forces or pressures.

27. Method according to claim 24 further comprising selecting the second selected time such that a first pack phase injection fluid force or pressure that occurs within the first cavity (300*a*) during an injection cycle occurs at a first pack phase time that is offset from a second pack phase time at which a second pack phase injection fluid force or pressure occurs within the second cavity (300*b*) during the injection cycle.

28. Method according to claim 24 further comprising injecting the injection fluid (18) into the first and second cavities (300*a*, 300*b*) first under a filling phase pressure or force and subsequently under a pack phase pressure or force, the filling phase pressure or force being substantially less than the pack phase pressure or force.

29. A method of performing an injection cycle comprising operating an apparatus according to claim 1 to perform an injection cycle.

\* \* \* \* \*